(12) United States Patent
Dandawate et al.

(10) Patent No.: US 7,184,416 B2
(45) Date of Patent: Feb. 27, 2007

(54) TECHNIQUES TO CANCEL ECHO TAIL

(75) Inventors: Amod V. Dandawate, Basking Ridge, NJ (US); Qian C. Xie, Long Branch, NJ (US); Huaiyu Zeng, Red Bank, NJ (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 10/154,707

(22) Filed: May 22, 2002

(65) Prior Publication Data
US 2003/0218992 A1 Nov. 27, 2003

(51) Int. Cl.
*H04B 3/20* (2006.01)
(52) U.S. Cl. .................... 370/286; 375/346
(58) Field of Classification Search .............. None
See application file for complete search history.

(56) References Cited

U.S. PATENT DOCUMENTS

| | | | | |
|---|---|---|---|---|
| 6,256,383 B1 * | 7/2001 | Chen | ............ | 379/406.08 |
| 6,317,419 B1 | 11/2001 | Olafsson et al. | | |
| 6,583,662 B1 * | 6/2003 | Lim | ............ | 327/553 |
| 6,694,010 B1 * | 2/2004 | Verreault | ............ | 379/386 |
| 6,813,352 B1 * | 11/2004 | Duttweiler | ............ | 379/406.08 |
| 6,826,279 B1 * | 11/2004 | Alavi et al. | ............ | 379/406.08 |
| 2003/0016815 A1 * | 1/2003 | Kurtz et al. | ............ | 379/406.01 |
| 2005/0117739 A1 * | 6/2005 | Demirekler et al. | ... | 379/406.08 |

OTHER PUBLICATIONS

Telecommunication Standarization Sector of Itu, "Series G: Transmission Systems and Media, Digital Systems and Networks" Single-pair high-speed digital subscriber line (SHDSL) transceivers—For approval—Updated G.991.2 (Feb. 2001), 183 pgs.

* cited by examiner

*Primary Examiner*—Duc Ho
(74) *Attorney, Agent, or Firm*—Glen B. Choi

(57) ABSTRACT

Techniques are provided for reducing the magnitude of echo tails in a near-end modem. The invention may use an echo tail canceller to generate a signal that cancels echo tail. One characteristic of the echo tail canceller may be determined during a time when only the near-end modem is scheduled to transmit signals. Another characteristic of the echo tail canceller may be determined at approximately the time that a body echo canceller has reached convergence and may be re-determined periodically thereafter. The near-end modem may subtract from any received signal an echo tail canceller signal generated by the echo tail canceller to cancel echo tail from the received signal.

30 Claims, 6 Drawing Sheets

TECHNIQUES TO CANCEL ECHO TAIL

FIELD OF THE INVENTION

This invention generally relates to techniques for reducing echo in communication systems and more particularly to techniques for reducing echo tail.

DESCRIPTION OF RELATED ART

It is well known that in many communications systems, transmission of signals between transmitter and receiver pairs generates noise arising from signal reflection (so called "echo"). Consequently, echo often corrupts the signal quality of a transmitted signal so that a receiver cannot accurately reproduce the signal. For example, FIG. 1 depicts a plot of a combination of "body" and "tail" components of noise resulting from an impulse signal.

BRIEF DESCRIPTION OF THE DRAWINGS

Note that use of the same reference numbers in different figures indicates the same or like elements.

DETAILED DESCRIPTION

In accordance with an embodiment of the present invention, techniques are provided for reducing the magnitude of echo tails in a near-end modem. This embodiment uses an echo tail canceller to generate a signal that cancels echo tail. One characteristic of the echo tail canceller may be determined during a time when only the near-end modem is scheduled to transmit signals. Another characteristic of the echo tail canceller may be determined at approximately the time that a body echo canceller has reached convergence. The near-end modem may subtract from any received signal an echo tail canceller signal generated by the echo tail canceller to cancel echo tail from the received signal. These and other features and advantages of the present invention will become more apparent from the following detailed description taken together with the accompanying drawings.

Figure 1:
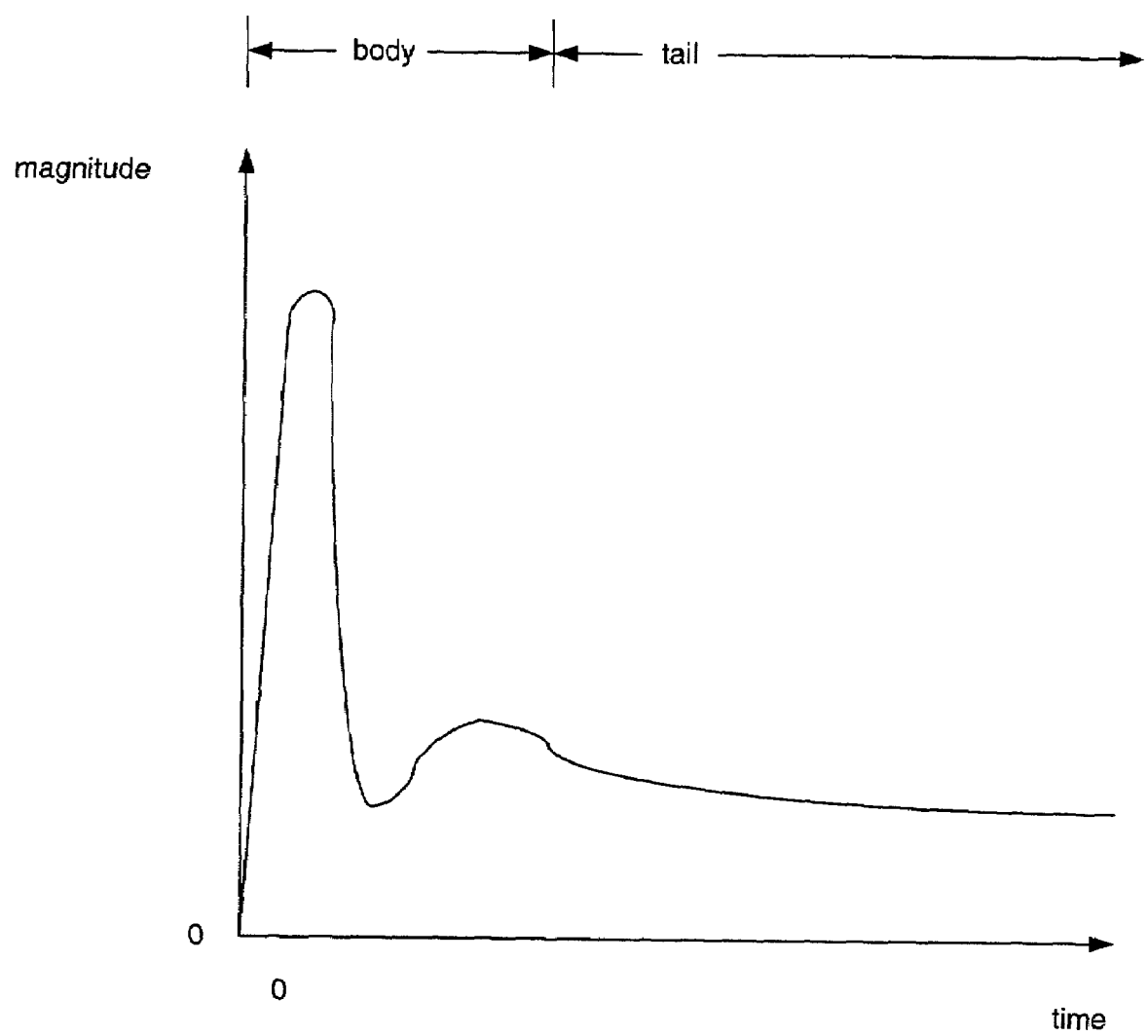
FIG. 1 depicts a plot of a combination of "body" and "tail" components of noise resulting from an impulse signal.
Figure 2A:
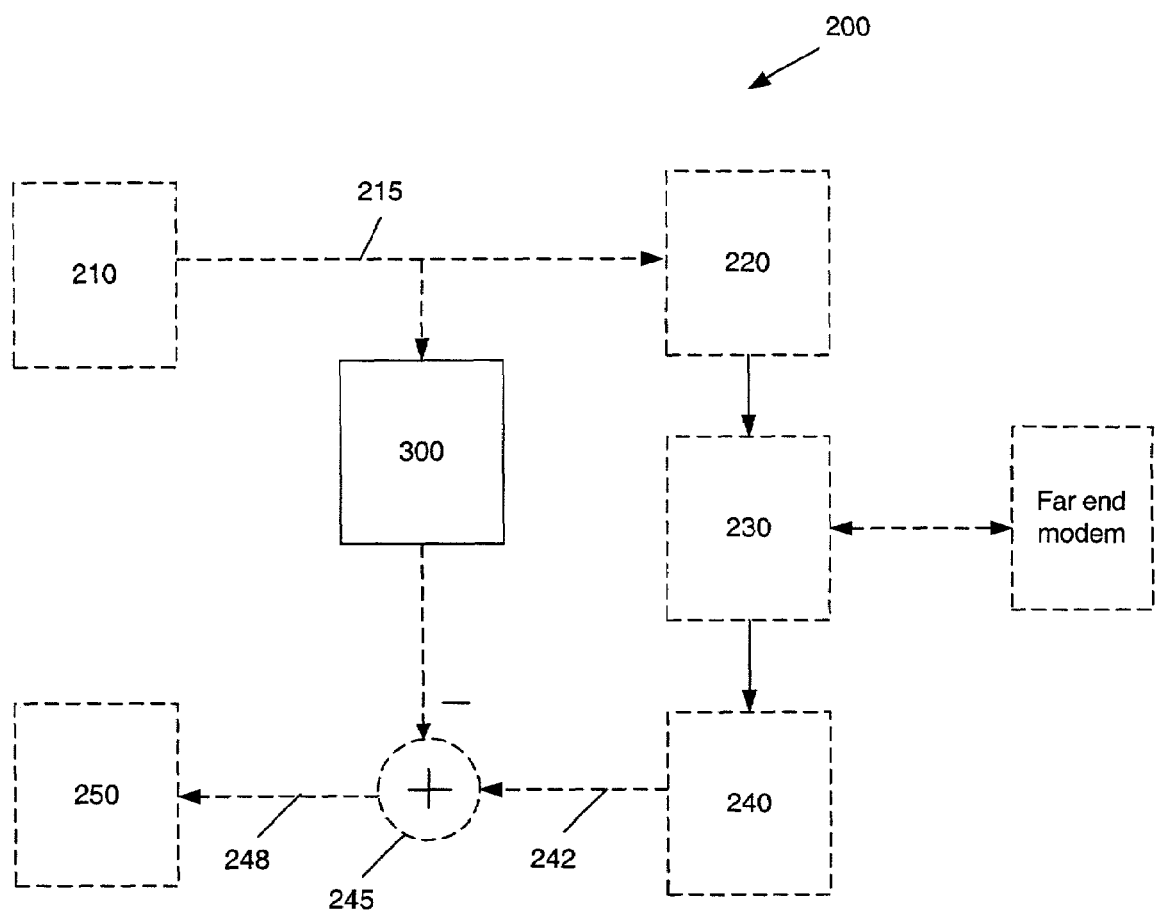
FIG. 2A depicts in block diagram form an example of a system in which an echo canceller can be used.

FIG. 2A depicts in block diagram form an example of a system 200 in which an echo canceller 300 may be used. For example, system 200 may be a DSL modem. For a description of DSL modems, see for example, Thomas Starr, "Understanding Digital Subscriber Line Technology", 1999 and ITU-T G.991.2 (G.shds1). Scrambler/encoder/modulator 210 may perform scrambling, modulation and 2B1Q encoding on a signal to be transmitted to a far-end modem (e.g., a far-end DSL modem) and provide the signal to the echo canceller 300 and coder/filter 220. Coder/filter 220 may for example perform digital-to-analog conversion, filtering, and rate conversion operations. Coder/filter 220 may provide the signal to be transmitted to signal gate 230, which may transmit and receive signals to and from a far-end modem using, for example, a twisted pair telephone line, an antenna, coaxial and/or parallel cable. Signal gate 230 may provide signals received from a far-end modem to front end device 240.

Front end device 240 may perform analog-to-digital conversion, rate conversion, and filtering on the received signals. Summer 245 can receive a signal from echo canceller 300 and separately, the processed received signals from front end device 240. Hereafter "received signal 242" refers to the signal provided to summer 245 that may include a signal transmitted from a far-end modem, as well as noise arising from echo. Summer 245 may provide a summed signal to decoder 250. Decoder 250 may perform decision feedback equalization, 2B1Q decoding and descrambling on a signal provided by summer 245. While a DSL modem is shown as a suitable system in which echo canceller 300 may be used, the echo canceller 300 can be used to reduce echo tail by any modem such as ITU V.90 compliant modems, voice band modems, duplex modems, or wireless modems.

Figure 2B:
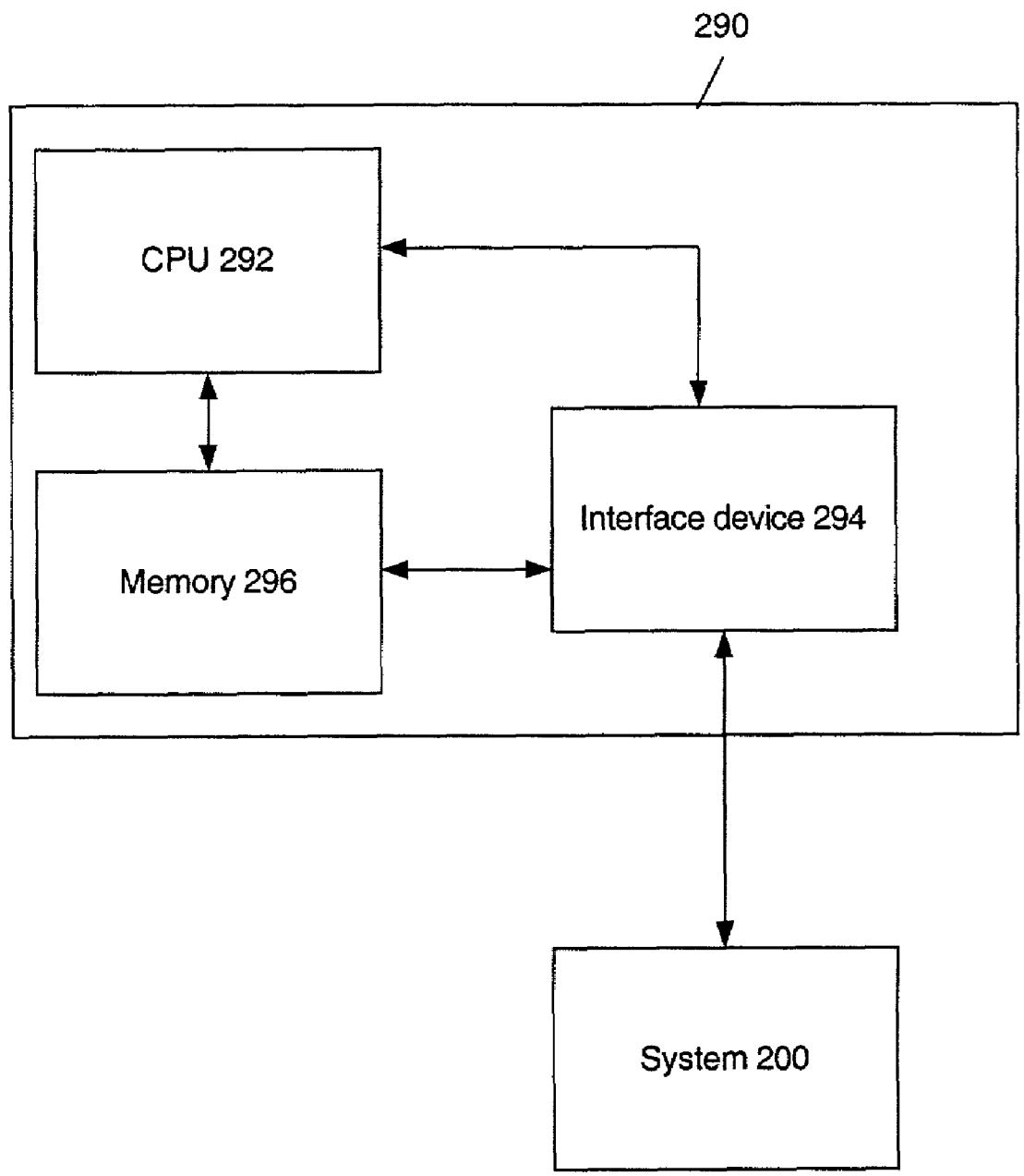
FIG. 2B depicts an example system including a personal computer.

System 200 can be coupled for use with a personal computer (PC). FIG. 2B depicts an example system showing a system 200 and PC 290. PC 290 may include a central processing unit (CPU) 292, input/output (I/O) interface device 294, and memory 296. System 200 may be coupled to the interface device 294 using a coaxial, parallel, serial cable, or wireless connection and utilize the Peripheral Component Interconnect (PCI), Universal Serial Bus (USB), Ethernet (IEEE 802.3), IEEE 1394, and/or other standards to communicate with PC 290.

Figure 3:
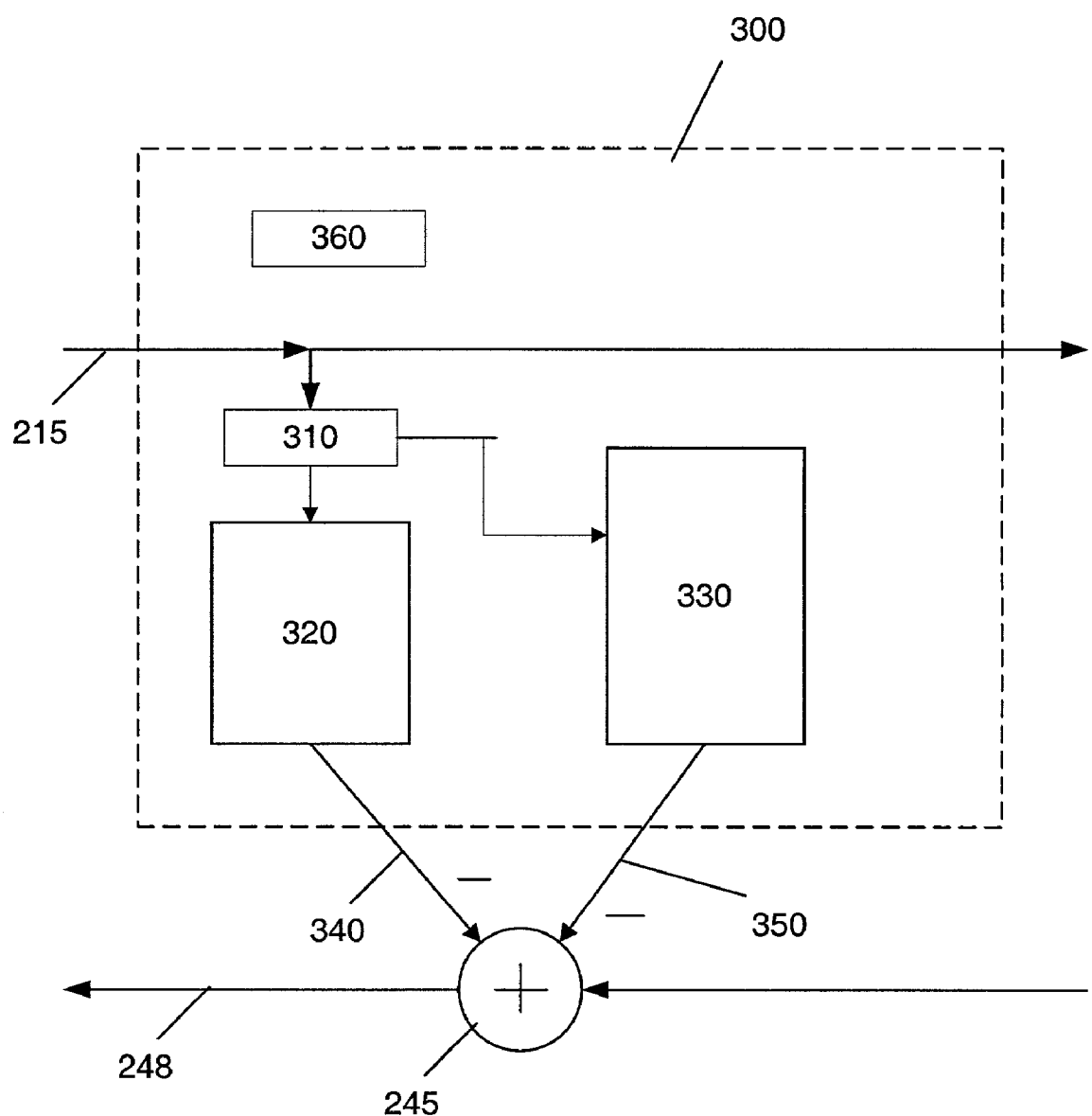
FIG. 3 depicts in block diagram form an echo canceller, in accordance with an embodiment of the present invention.

FIG. 3 depicts in block diagram form echo canceller 300, in accordance with an embodiment of the present invention. Controller 360 can manage the operation of echo canceller 300. Echo canceller 300 may be coupled to receive a signal 215 to be transmitted by the near-end modem for example from scrambler/encoder/modulator 210 (FIG. 2A). Hereafter "transmit signal 215" means any signal to be transmitted to a far-end modem by a device that uses echo canceller 300.

Echo canceller 300 may include a delay element 310, body echo canceller 320, and tail echo canceller 330. Delay element 310 may be coupled to receive the transmit signal 215. Delay element 310 can be a delay element that establishes a time window of an echo impulse response that is transferred to body echo canceller 320 and tail echo canceller 330. The time period of the window can be set so that a substantially relevant part of the echo body is captured and the uncaptured echo tail portion is substantially exponential in shape. Body echo canceller 320 may receive the transmit signal 215 after a delay introduced by delay element 310. Body echo canceller 320 may be implemented as a finite impulse response (FIR) filter having multiple taps. Body echo canceller 320 may filter the transmit signal 215 and output an echo body canceller signal 340 to summer 245.

The echo canceller 300 can be implemented as software executed by a digital signal processor or central processing unit (CPU) within a modem or personal computer. The echo canceller 300 can also be implemented as firmware and/or hardware.

Figure 4:
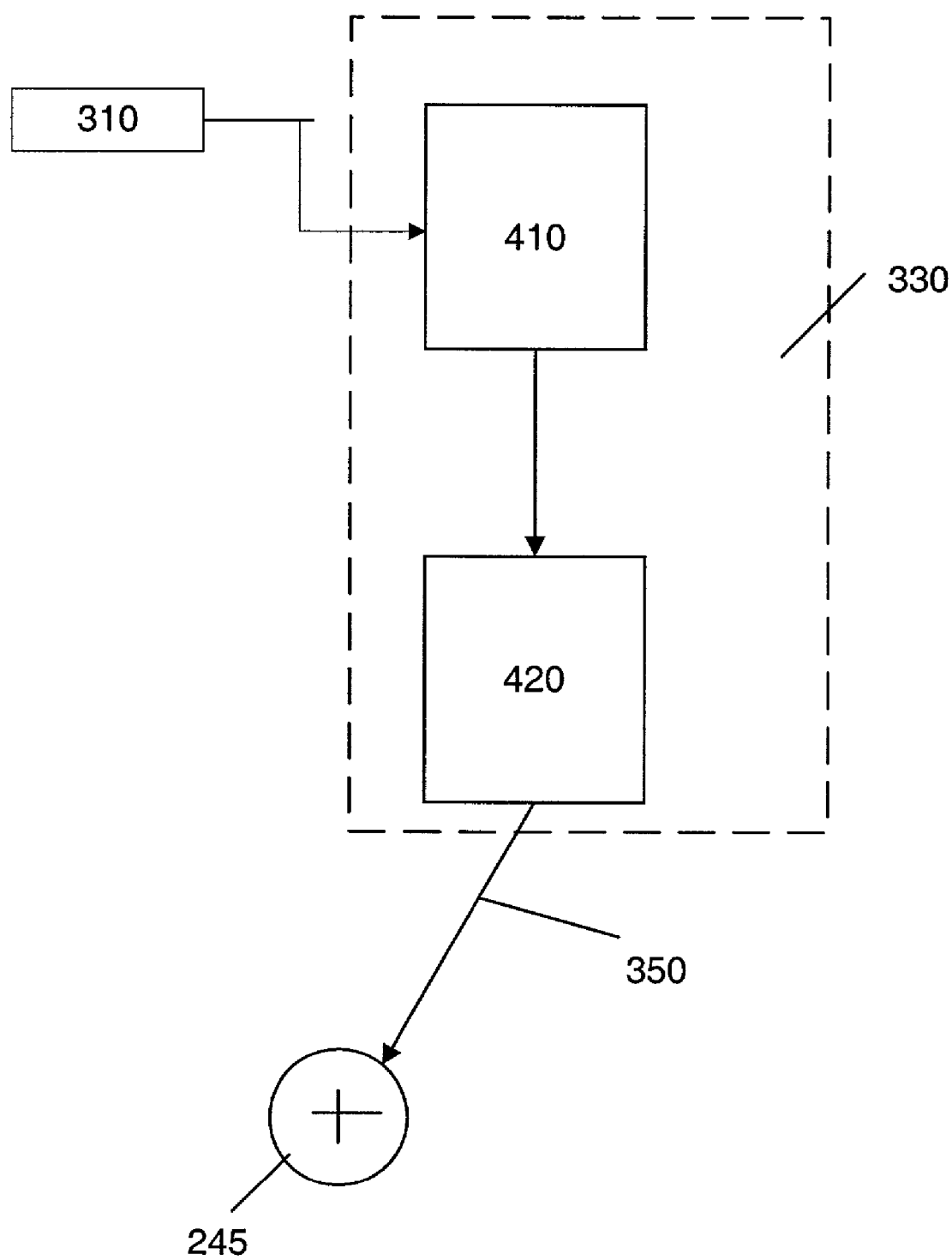
FIG. 4 depicts a block diagram of an tail echo canceller in accordance with an embodiment of the present invention.

FIG. 4 depicts an example implementation of tail echo canceller 330 in accordance with an embodiment of the present invention. Tail echo canceller 330 may include a delay 410 and a tail filter 420. Delay 410 can be coupled to receive a portion of signal 215 from delay 310. Delay 410 may delay signal 215 by an amount equivalent to the amount of delay introduced by body echo canceller 320 during signal processing by body echo canceller 320 of signal 215. Tail filter 420 can be coupled to receive the delayed signal 215 from delay 310.

Tail filter 420 may be implemented as a one (1) pole digital infinite impulse response (IIR) auto regressive response filter whose gain and pole characteristics are programmable. Although, the tail filter 420 can be implemented as a multiple pole and/or zero filter. The following equation can be used to represent a transfer function of tail filter 420:

$$b/(1-(a/z)),$$

where a is the pole location of tail filter 420, and b is the gain of tail filter 420.

According to pole and gain characteristics, the tail filter 420 may generate an echo tail canceller signal 350 in response to an input signal such as signal 215. In accordance with an embodiment of the present invention, the gain and pole characteristics of tail filter 420 can be determined using the process 500 described with respect to FIG. 5 described below. Tail filter 420 can output echo tail canceller signal 350 to the summer 245. In the time domain, signal 350 may be exponentially decaying.

Summer 245 can be coupled to receive echo body canceller signal 340, echo tail canceller signal 350, and received signal 242. From the received signal 242, summer 245 may subtract echo body canceller signal 340 and echo tail canceller signal 350. Summer 245 may remove echo noise from the received signal 242 to generate noise reduced signal 248. When signals 242, 340 and 350 are digital signals, respective front end device 240, body echo canceller 320, and tail echo canceller 330 may provide to summer 245 signals having the sample period. Summer 245 may transfer the noise reduced signal 248 for example to decoder 250 as described with respect to FIG. 2A or any other signal processing device.

Figure 5:
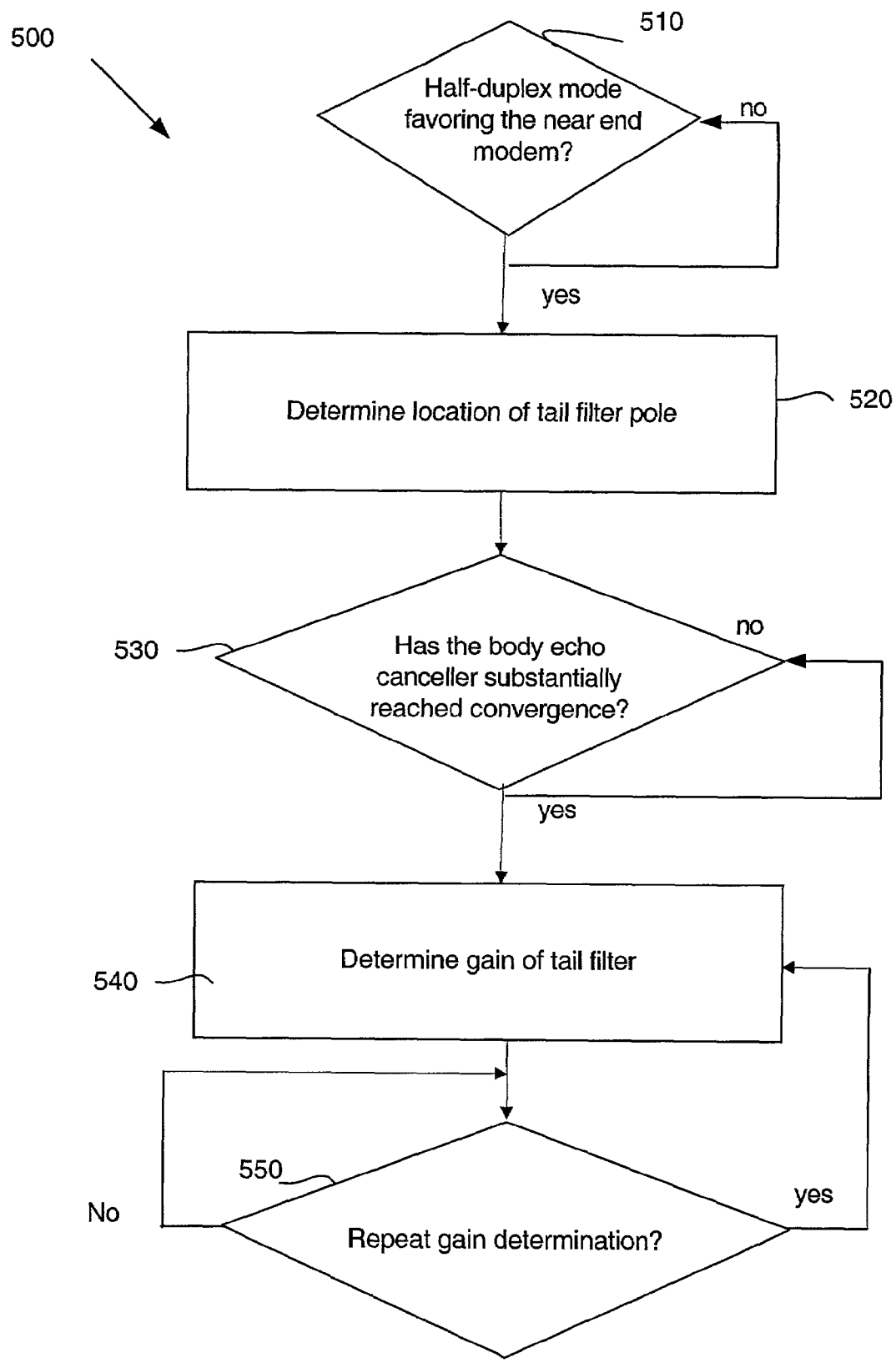
FIG. 5 depicts a flow diagram illustrating an example operation of one embodiment of the present invention.

FIG. 5 depicts in process 500 a flow diagram illustrating an example operation of one embodiment of the present invention. In action 510 of process 500, the controller 360 (FIG. 3) monitors for a period when only the modem that uses echo canceller 300 (also known as a "near end" modem) is scheduled to transmit signals (e.g., a half-duplex period). One such half-duplex period for DSL communication systems, defined by ITU-T G.991.2 (G.shds1), is between the "handshake" and "activation" modes. If the process 500 is executed by a CPU, such period may be set as a time when the CPU is not processing data from the far-end modem and therefore any data processing activities would not be disrupted or slowed by execution of process 500.

In action 520, the controller 360 determines the frequency location of a pole of the tail filter 420. During half-duplex mode, the near-end modem may transmit a signal to a far-end modem and monitor the response from the far-end modem. A response to the signal transmitted by the near-end modem includes a combination of the originally transmitted signal and the echo generated by such transmitted signal. Based on a comparison between the transmitted signal and its echo, characteristics of the echo characteristics (tail and body) may be determined. Samples of the received combination signal can be represented by the following relationship:

$$y(k)=ay(k-1)+bx(k)$$

where k is the index of the present sample, x(k) is the signal sent by the near-end modem to the far-end modem, y(k−1) is the previous sample value of the echo signal received by the near-end modem, a is the pole location of the tail filter 420, and b is the gain of the tail filter 420.

In action 520, the controller 360 may determine the pole location for the tail filter 420 (value a) by determining cross correlation of signals 215 and 242 and then using a Yule-Walker technique based on the results of the cross correlation. Advantages from the use of a cross correlation technique include improved noise immunity and small time to determine the pole.

Advantageously, the echo canceller 300 may perform pole determination during a period when the near-end modem is not performing extensive data processing (e.g., during half-duplex mode) so to not disrupt other operations that could be performed (e.g., data processing on the received signal 242 or on a transmitted signal 215).

In action 530, the controller 360 waits for the body echo canceller 320 to reach convergence. Convergence may occur when the variation in tap coefficients of body echo canceller 320 are within a programmed span or after a programmed period of time. Advantageously, the echo canceller 300 may avoid the need to recalculate gain of the tail filter 420 multiple times by waiting until the body echo canceller 320 has substantially achieved convergence before determining the gain characteristics of the tail filter 420.

In action 540, the controller 360 estimates a suitable gain (value b) of the tail filter 420. The controller may estimate the gain of the tail filter 420 using the last (i.e., most recent in time) filter tap coefficient of body echo canceller 320. The gain of the tail filter 420 may be the product of (1) such last tap coefficient and (2) the pole value of tail filter 420. The appropriate last tap coefficient can be selected after a specific number of counted samples of the echo body provided to the body echo canceller 320. For example, laboratory tests can be used to determine the count of the echo body sample value at which to determine the last tap coefficient of the body echo canceller 320. In another embodiment, the controller 360 could use several of the last (i.e., most recent) tap coefficients from the body echo canceller 320. For example, if three (3) last tap coefficients are used, the gain may be determined by the product of (a) the geometric mean of the three (3) last (i.e., most recent) tap coefficients and (b) the square of the pole value. Action 540 may be performed during so-called "activation mode" as described in JTU-T G.991.2 (G.shdsl) and does not need to be performed during half-duplex mode or other period when the processor that performs action 540 does not perform processing.

After action 540, the controller 360 can enable operation of the tail filter 330 to generate echo tail canceller signal 350. Tail filter 330 may receive a version of the transmit signal 215 from delay 310. The tail filter 330 can output the echo tail canceller signal 350 to summer 245 in response to transmit signal 215.

In action 550, the controller determines whether to repeat action 540. For example, in one implementation, the controller 360 repeats action 540 every baud although other time increments or transmitted signal increments may be used.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
   a signal gate to transmit an output signal to a far-end modem; and
   an echo canceller to receive an input signal from the far-end modem and the output signal, the echo canceller comprises a body echo canceller and tail echo canceller, the echo canceller is to generate an echo tail reducing signal, the echo canceller is to determine a first signal response characteristic of the tail echo canceller during a period when only the signal gate is permitted to transmit signals, and the echo canceller is to determine a second characteristic of the tail echo canceller after the body echo canceller has achieved convergence and the second characteristic comprises gain.

2. The apparatus of claim 1, wherein the body echo canceller comprises a filter.

3. The apparatus of claim 1, wherein the body echo canceller comprises a finite impulse response filter.

4. The apparatus of claim 1, wherein the tail echo canceller comprises a filter.

5. The apparatus of claim 4, wherein the first signal response characteristic comprises a pole of the tail echo canceller.

6. The apparatus of claim 5, wherein the echo canceller is to determine the pole using cross correlation and Yule-Walker techniques.

7. The apparatus of claim 1, wherein the tail echo canceller comprises an infinite impulse response filter.

8. The apparatus of claim 1, wherein the echo canceller is to periodically determine the second characteristic.

9. A system comprising:
   a signal gate to transmit an output signal and to receive from a far-end modem an input signal;
   an echo canceller to receive the input signal and to receive the output signal, wherein the echo canceller comprises a body echo canceller and tail echo canceller and wherein:
      the echo canceller is to generate an echo body reducing signal and an echo tail reducing signal,
      the echo canceller is to determine a first signal response characteristic of the tail echo canceller during a period when only the signal gate is permitted to transmit signals, and
      the echo canceller is to determine a second response characteristic of the tail echo canceller after the body echo canceller has achieved convergence, the second response characteristic comprises gain; and
   a summer to receive the echo tail reducing signal and the input signal, the summer is to subtract the echo tail reducing signal from the input signal and to output an echo reduced signal.

10. The system of claim 9, wherein the signal gate uses a twisted pair line to communicatively couple to a far-end modem.

11. The system of claim 9, wherein the signal gate uses a coaxial cable to communicatively couple to a far-end modem.

12. The system of claim 9, wherein the signal gate uses an antenna to communicatively couple to a far-end modem.

13. The system of claim 9, further comprising an interface device to receive the echo reduced signal.

14. The system of claim 13, wherein the interface device is to communicatively couple to the summer using a IEEE 1394 compliant interface.

15. The system of claim 13, wherein the interface device is to communicatively couple to the summer using a universal serial bus compliant interface.

16. The system of claim 13, wherein the interface device is to communicatively couple to the summer using a PCI compliant interface.

17. A method comprising:
   monitoring for a period when only a near-end modem is permitted to transmit signals;
   transmitting a signal;
   monitoring for a received signal;
   determining a first characteristic of an echo tail canceller based in part on the received signal; and
   determining a second characteristic of the echo tail canceller after a body echo canceller associated with the near-end modem reaches convergence, the second characteristic relates to a gain of the echo tail canceller.

18. The method of claim 17, wherein the first characteristic relates to a pole of the echo tail canceller.

19. The method of claim 18, wherein the determining the first characteristic comprises using cross correlation and Yule-Walker techniques.

20. The method of claim 17, further comprising providing an echo reducing signal in part using the echo tail canceller.

21. An echo reducer for use by a near-end modem comprising:
   a body echo reducer and a tail echo reducer,
      the echo reducer is to determine a first signal response characteristic of the tail echo reducer based on an input signal,
      the echo reducer is to determine the first signal response characteristic of the tail echo reducer during a time when only the near-end modem is permitted to transmit signals, and
      the echo reducer is to determine a second characteristic of the tail echo reducer after the body echo reducer has achieved convergence, the second characteristic comprises gain.

22. The echo reducer of claim 21, further comprising a signal transmission logic, wherein the echo reducer is to determine a first signal response characteristic of the tail echo reducer during a half-duplex period when only the transmission logic is permitted to transmit signals to a partner.

23. The echo reducer of claim 21, wherein the first signal response characteristic comprises a pole location.

24. The echo reducer of claim 23, wherein the echo reducer is to determine the pole location using cross correlation and Yule-Walker techniques.

25. The echo reducer of claim 21, wherein the body echo reducer comprises a multiple tap finite impulse response filter.

26. The echo reducer of claim 21, wherein the tail echo reducer comprises an infinite impulse response filter.

27. The echo reducer of claim 26, wherein the gain comprises a product of at least one tap coefficient and a pole of the infinite impulse response filter.

28. The echo reducer of claim 21, wherein the tail echo reducer comprises an infinite impulse response filter with multiple pole locations.

29. The echo reducer of claim 21, wherein the tail echo reducer comprises an infinite impulse response filter with multiple zero locations.

30. The echo reducer of claim 21, wherein the body echo reducer is to provide a body echo reducing signal based in part on an input signal and wherein the tail echo reducer is to provide a tail echo reducing signal based in part on the input signal.

* * * * *